(12) United States Patent
Hecht (10) Patent No.: US 9,033,622 B2
(45) Date of Patent: May 19, 2015

(54) CUTTING INSERT HAVING CURVED RAMPS FOR INSERTION INTO A TOOL HOLDER, CUTTING TOOL AND METHOD OF ASSEMBLY

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 666 days.

(21) Appl. No.: 13/425,152

(22) Filed: Mar. 20, 2012

(65) Prior Publication Data
US 2013/0170917 A1 Jul. 4, 2013

Related U.S. Application Data

(60) Provisional application No. 61/582,756, filed on Jan. 3, 2012.

(51) Int. Cl.
| B23B 27/16 | (2006.01) |
| B23B 27/04 | (2006.01) |
| B23B 29/04 | (2006.01) |
| B23B 27/00 | (2006.01) |

(52) U.S. Cl.
CPC ........... *B23B 27/04* (2013.01); *Y10T 29/49876* (2015.01); *Y10T 407/2288* (2015.01); *Y10T 407/23* (2015.01); *Y10T 407/28* (2015.01); *Y10T 407/2286* (2015.01); *B23B 29/043* (2013.01); *B23B 2205/02* (2013.01); *B23B 2200/165* (2013.01); *B23B 2260/0785* (2013.01)

(58) Field of Classification Search
CPC .............. Y10T 407/23; Y10T 407/235; Y10T 407/245; Y10T 407/2286; Y10T 407/2288
USPC ........................................................ 407/110
See application file for complete search history.

(56) References Cited

U.S. PATENT DOCUMENTS

| 4,573,832 | A | | 3/1986 | Zinner |
| 4,588,333 | A | | 5/1986 | Gustafson |
| 4,938,641 | A | * | 7/1990 | Maier ........................... 407/110 |
| 4,992,007 | A | * | 2/1991 | Satran ........................... 407/110 |
| 5,150,992 | A | * | 9/1992 | Friedmann .................... 407/110 |
| 5,516,241 | A | * | 5/1996 | Plutschuck et al. ........... 407/110 |
| 5,697,271 | A | | 12/1997 | Friedman et al. |
| 5,795,109 | A | | 8/1998 | Jonsson et al. |
| 5,803,675 | A | * | 9/1998 | Von Haas ...................... 407/107 |
| 6,065,906 | A | | 5/2000 | Hansson |
| 6,234,727 | B1 | | 5/2001 | Barazani |

(Continued)

FOREIGN PATENT DOCUMENTS

WO 2004/048020 6/2004

OTHER PUBLICATIONS

International Search Report dated Apr. 15, 2013 issued in PCT counterpart application (No. PCT/IL2012/050507).

*Primary Examiner* — Will Fridie, Jr.
(74) *Attorney, Agent, or Firm* — Womble Carlyle (57) ABSTRACT

A cutting tool used for grooving and turning operations where a cutting insert is resiliently securable in a holder blade. The cutting insert includes an insert central lower surface located between, and recessed with respect to, two insert lower component surfaces, each having an insert lower abutment surface. At least one of the two insert lower component surfaces includes an insert inner curved ramp extending from its insert lower abutment surface to the adjacent insert lower intermediate surface and at least the other of the two insert lower component surfaces includes an insert outer curved ramp extending from its insert lower abutment surface to an adjacent end surface.

25 Claims, 7 Drawing Sheets

(56) References Cited

U.S. PATENT DOCUMENTS

| | | | |
|---|---|---|---|
| 6,565,292 B2 * | 5/2003 | Hecht | 407/110 |
| 7,329,072 B2 | 2/2008 | Nagaya et al. | |
| 7,331,096 B2 | 2/2008 | Kugler et al. | |
| 7,524,147 B2 * | 4/2009 | Hecht | 407/107 |
| 8,647,029 B2 * | 2/2014 | Hecht | 407/110 |
| 8,695,189 B2 * | 4/2014 | Hecht | 29/267 |
| 2010/0061814 A1 | 3/2010 | Hecht | |
| 2011/0303070 A1 | 12/2011 | Baernthaler et al. | |

* cited by examiner

CUTTING INSERT HAVING CURVED RAMPS FOR INSERTION INTO A TOOL HOLDER, CUTTING TOOL AND METHOD OF ASSEMBLY

RELATED APPLICATIONS

This application claims priority to U.S. Provisional Patent Application No. 61/582,756, filed 3 Jan. 2012, whose contents are incorporated by reference in their entirety.

FIELD OF THE INVENTION

The subject matter of the present application relates to grooving and parting cutting tools of the type in which a cutting insert is retained in a holder blade by means of a clamping force.

BACKGROUND OF THE INVENTION

Cutting tools for grooving and parting can be provided with a clamping mechanism for securely retaining a cutting insert within a holder blade.

The holder blade can consist of a base jaw and clamping jaw where the cutting insert is clamped within the base jaw and clamping jaw.

A key can be provided to aid the insertion and removal of the cutting insert into, and out of, the holder blade.

Examples of such cutting inserts are disclosed in U.S. Pat. No. 4,573,832 and WO 2004/048020.

An example of such a holder blade is disclosed in U.S. Pat. No. 5,795,109.

Examples of such cutting tools are disclosed in U.S. Pat. No. 4,588,333, U.S. Pat. No. 6,234,727, U.S. Pat. No. 7,329,072 and U.S. Pat. No. 7,331,096.

In addition, various keys are disclosed in U.S. Pat. No. 5,697,271 and EP 1007254.

It is an object of the subject matter of the present application to provide a cutting tool having an improved means of resiliently clamping a cutting insert in an insert receiving pocket of a holder blade.

It is also an object of the subject matter of the present application to provide an improved cutting tool where an upper clamping jaw of the insert receiving pocket is resiliently displaced relative to an opposing lower base jaw solely by the action of urging the cutting insert into the insert receiving pocket.

SUMMARY OF THE INVENTION

In accordance with the subject matter of the present application, there is provided a cutting insert, longitudinally elongated in a direction defining an insert longitudinal axis, comprising:

opposing insert upper and lower surfaces and a peripheral surface extending therebetween, the peripheral surface comprising two opposing end surfaces, at least one of the end surfaces having an integral cutting portion; wherein
the insert upper surface comprises an insert upper abutment surface;
the insert lower surface comprises:
two longitudinally spaced apart insert lower component surfaces, each insert lower component surface having an insert lower abutment surface;
an insert central lower surface located between, and recessed with respect to, the two insert lower component surfaces;
an insert lower intermediate surface extending between the insert central lower surface and each insert lower component surface; wherein
at least one of the two insert lower component surfaces includes an insert inner curved ramp extending from its insert lower abutment surface to the adjacent insert lower intermediate surface and at least the other of the two insert lower component surfaces includes an insert outer curved ramp extending from its insert lower abutment surface in a direction of the adjacent end surface.

Also in accordance with the subject matter of the present application, there is provided a cutting tool, comprising:
a holder blade, having a holder longitudinal axis extending in a forward to rearward direction, comprising:
a body portion and a clamping portion;
the clamping portion having an insert receiving slot opening out to a holder front end surface of the holder blade, the insert receiving slot comprising:
an upper clamping jaw having a clamping jaw abutment surface and a lower base jaw having a base jaw lower surface, the upper clamping jaw being resiliently displaceable relative to the lower base jaw; the base jaw lower surface comprising:
a front base jaw component surface adjacent the holder front end surface and a rear base jaw component surface rearwardly spaced apart from the front base jaw component surface, the front and rear base jaw component surfaces each comprising a holder lower abutment surface;
a base jaw central surface located between, and recessed with respect to, the front and rear base jaw component surfaces;
a holder lower intermediate surface, extending between the base jaw central surface and each base jaw component surface;
a cutting insert resiliently clamped between the upper clamping jaw and the lower base jaw; wherein
the insert upper abutment surface abuts the clamping jaw abutment surface, the insert lower abutment surface of the insert lower component surface closest to the operative cutting portion abuts the holder lower abutment surface of the front base jaw component surface, and the insert lower abutment surface of the insert lower component surface furthest from the operative cutting portion abuts the holder lower abutment surface of the rear base jaw component surface; and
at least the insert lower component surface closest to the operative cutting portion has an insert inner curved ramp, and at least the insert lower component surface furthest from the operative cutting portion has an insert outer curved ramp.

Also in accordance with the subject matter of the present application, there is provided a method for assembling a longitudinally elongated cutting insert in a holder blade, the holder blade, having a holder longitudinal axis extending in a forward to rearward direction, comprising;
a body portion and a clamping portion;
the clamping portion having an insert receiving slot opening out to a holder front end surface of the holder blade, the insert receiving slot comprising:
an upper clamping jaw and a lower base jaw;
the upper clamping jaw being resiliently displaceable relative to the lower base jaw,
the lower base jaw having a base jaw lower surface, the base jaw lower surface including a front base jaw component surface longitudinally spaced apart from a rear base jaw component surface, with a base jaw central surface located between and recessed with respect to the front and rear base jaw component surfaces;

the cutting insert comprising:

opposing insert upper and lower surfaces extending substantially parallel to an insert longitudinal axis and a peripheral surface extending therebetween;

the insert lower surface having two longitudinally spaced apart insert lower component surfaces, with an insert central lower surface located between and recessed with respect to the two insert lower component surfaces; and the peripheral surface having two opposing end surfaces defining a longitudinal insert length, at least one of the end surfaces having an integral cutting portion, the method comprising the steps of:

positioning the cutting insert relative to the holder blade so that the insert longitudinal axis and the holder longitudinal axis are contained in a mutual main plane and the insert lower surface is in contact the base jaw lower surface;

sliding the cutting insert rearwardly until the upper clamping jaw undergoes resilient displacement; and applying an urging force F to the cutting insert in the rearward direction $D_R$ until the insert lower abutment surface of the insert lower component surface closest to the operative cutting portion abuts the holder lower abutment surface of the front base jaw component surface and the insert lower abutment surface of the insert lower component surface furthest from the operative cutting portion abuts the holder lower abutment surface of the rear base jaw component surface.

Also in accordance with the subject matter of the present application, there is provided a cutting insert, longitudinally elongated in a direction defining an insert longitudinal axis, comprising:

opposing insert upper and lower surfaces and a peripheral surface extending therebetween, the peripheral surface comprising two opposing end surfaces, at least one of the end surfaces having an integral cutting portion; wherein the insert upper surface comprises an insert upper abutment surface;

the insert lower surface comprises:

two longitudinally spaced apart insert lower component surfaces, each insert lower component surface having an insert lower abutment surface, the two spaced apart insert lower abutment surfaces forming a lower imaginary line parallel to the insert longitudinal axis, in a side view of the cutting insert;

a cutout formed in the insert lower surface between the two spaced apart insert lower abutment surfaces and bounded on one side by the lower imaginary line, the cutout extending for at least about one-third the length of the insert lower surface;

an insert inner curved ramp extending from at least a first of the two insert lower component surfaces in a direction of the cutout; and an insert outer curved ramp extending from at least a second of the two insert lower component surfaces in a direction of an adjacent end surface.

BRIEF DESCRIPTION OF THE FIGURES

For a better understanding of the present application and to show how the same may be carried out in practice, reference will now be made to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 1:
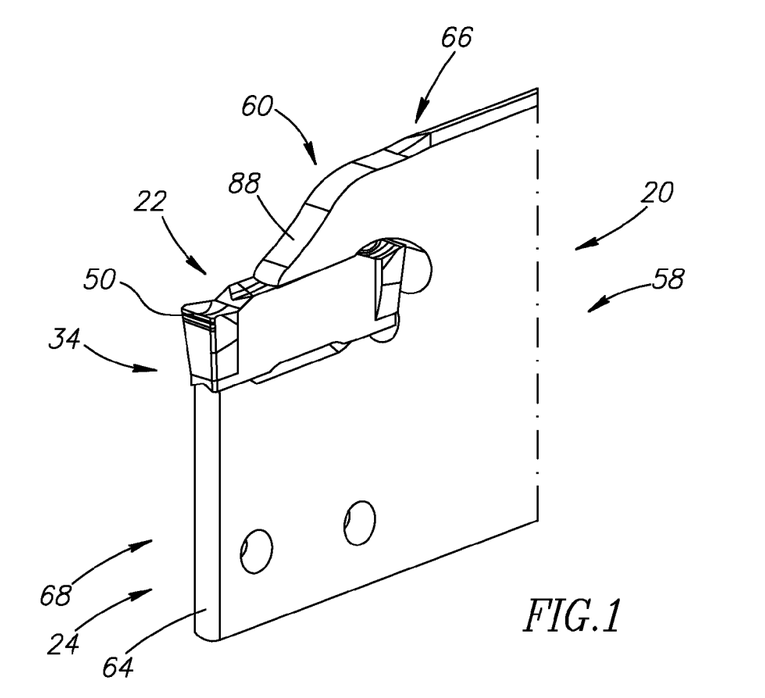
FIG. 1 is a perspective view of a cutting tool in accordance with a first embodiment of the present application.
Figure 2:
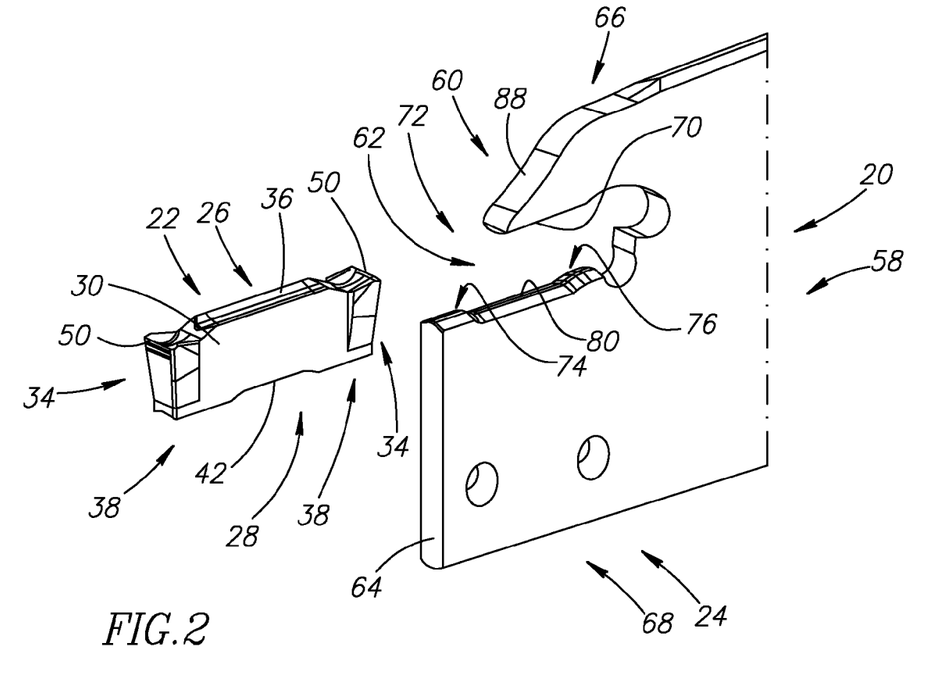
FIG. 2 is an exploded perspective view of the cutting tool shown in FIG. 1.

Attention is first drawn to FIGS. 1 and 2 showing a cutting tool 20, of the type used for grooving or parting, in accordance with a first embodiment of the subject matter of the present application. The cutting tool 20 has a cutting insert 22 and a holder blade 24 where the cutting insert 22 is resiliently clamped within the holder blade 24.

Figure 3:
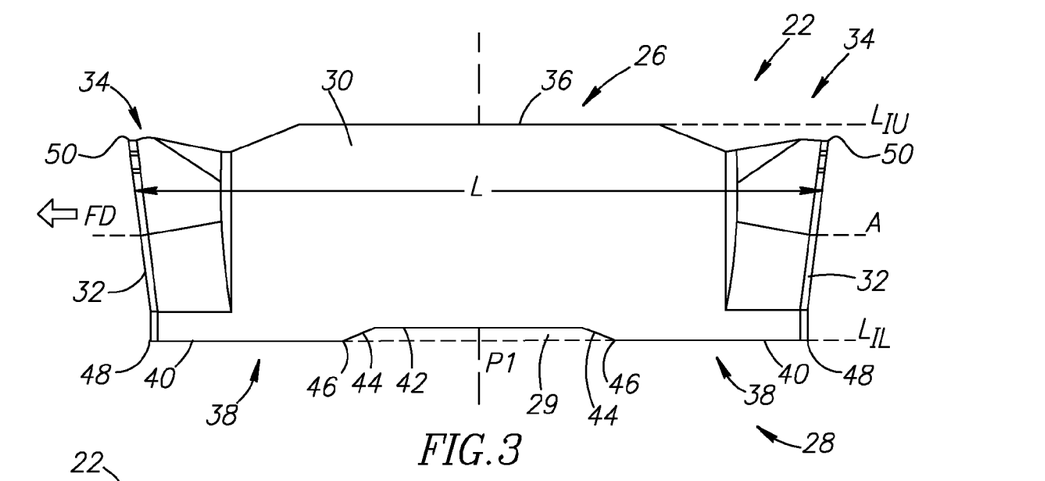
FIG. 3 is a side view of the cutting insert shown in FIG. 2.

Referring now to FIG. 3, the cutting insert 22 has an insert longitudinal axis A and is elongated in the same direction as said insert longitudinal axis A. The cutting insert 22 has an insert upper surface 26 and an opposing insert lower surface 28. There is a peripheral surface 30 that extends between the insert upper surface 26 and the insert lower surface 28. The peripheral surface 30 has two opposing end surfaces 32 that extend between the insert upper surface 26 and the insert lower surface 28, defining a longitudinal insert length L. In accordance with some embodiments of the subject matter of the present application, the insert upper and lower surfaces 26, 28 can extend substantially parallel to the insert longitudinal axis A. Located at, and formed integrally with (i.e., having unitary one-piece construction with), at least one of the end surfaces 32 is a cutting portion 34. At least one of the cutting portions 34 can have a cutting edge 50 associated with the insert upper surface 26. In accordance with some embodiments of the subject matter of the present application there can be two cutting portions 34. In such a configuration, the cutting insert 22 can be double-ended and indexable and exhibit mirror symmetry about a median plane P1, where the median plane P1 is oriented perpendicular to the insert longitudinal axis A and is located midway between the end surfaces 32. Alternatively, one of the cutting portions 34 can be associated with the insert lower surface 28 (not shown), in which case the cutting insert 22, does not exhibit mirror symmetry about the median plane P1, although it may instead exhibit 180° rotational symmetry about a central axis passing perpendicularly to the sides of the insert.

The insert upper surface 26 has an insert upper abutment surface 36 that is located between the end surfaces 32. The purpose of the insert upper abutment surface 36 is to provide an upper abutment zone between the cutting insert 22 and the holder blade 24 to ensure resilient clamping of the cutting insert 22. In a side view of the cutting insert 22, the insert upper abutment surface 36 can form an insert upper imaginary line $L_{IU}$ that is parallel to the insert longitudinal axis A of the cutting insert 22.

The insert lower surface 28 has two longitudinally spaced apart insert lower component surfaces 38. Additionally, each insert lower component surface 38 has an insert lower abutment surface 40. The purpose of the insert lower abutment surfaces 40 is to provide two lower spaced apart abutment zones between the cutting insert 22 and the holder blade 24 to ensure resilient clamping of the cutting insert 22. In a side view of the cutting insert 22, the spaced apart insert lower abutment surfaces 40 can form sections of an insert lower imaginary line $L_{IL}$, which is parallel to the insert longitudinal axis A. The insert lower surface 28 also has a non-abutting insert central lower surface 42 which is located between, and recessed with respect to, the insert lower component surfaces 38. The non-abutting insert central lower surface 42 is formed in a single, elongated lower insert cutout 29 which is visible in a side view of the cutting insert 22 and is bounded on one side by the insert lower imaginary line $L_{IL}$. In at least some embodiments, the elongated lower insert cutout 29 extends for at least one-third the length of the insert lower surface 28.

Figure 4:
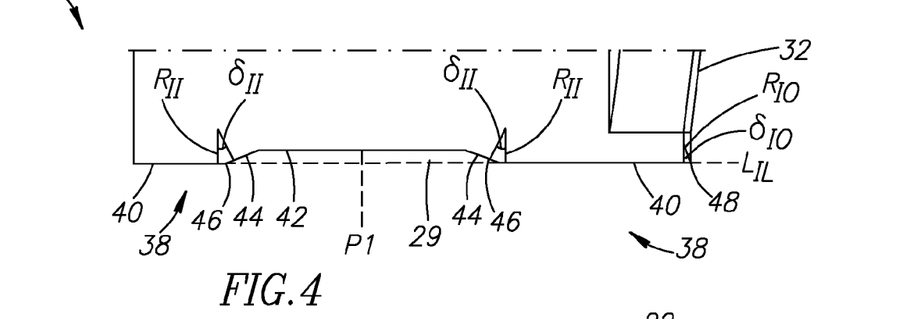
FIG. 4 is a detailed view of the cutting insert shown in FIG. 3.

Referring now to FIG. 4, showing a detailed view of a lower part of the cutting insert 22, the insert lower surface 28 has two insert lower intermediate surfaces 44, which extend between the insert central lower surface 42 and each insert lower component surface 38. At least one of the two insert lower component surfaces 38 includes an insert inner curved ramp 46 extending from its insert lower abutment surface 40 to the adjacent insert lower intermediate surface 44. Thus, as seen in the figures, the insert inner curved ramp 46 extends from the insert lower abutment surface 40 in a direction of the lower insert cutout 29. Each insert inner curved ramp 46 can have an insert inner radius of curvature $R_{II}$, which subtends an insert inner angle of curvature $\delta_{II}$, where $\delta_{II}$ can be greater than or equal to 20° and less than or equal to 40°. For example, the insert inner angle of curvature $\delta_{II}$ can have a value of 30°.

At least one of the two insert lower component surfaces 38 includes an insert outer curved ramp 48 extending from its insert lower abutment surface 40 in a direction of the adjacent end surface 32. Each insert outer curved ramp 48 can have an insert outer radius of curvature $R_{IO}$, which subtends an insert outer angle of curvature $\delta_{IO}$, where $\delta_{IO}$ can be greater or equal to 5° and less than or equal to 25°. For example, the insert outer angle of curvature $\delta_{IO}$ can have a value of 15°.

In accordance with some embodiments of the subject matter of the present application the insert outer radius of curvature $R_{II}$ can be equal to the insert outer radius of curvature $R_{IO}$.

When the cutting insert 22 exhibits mirror symmetry about the median plane P1 there are exactly two insert inner curved ramps 46 and two insert outer curved ramps 48. That is to say, both the insert lower component surfaces 38 have an insert inner curved ramp 46 and an insert outer curved ramp 48.

Further in accordance with some embodiments of the subject matter of the present application, the at least one insert inner curved ramp 46 can be tangential to its adjacent insert lower abutment surface 40 at the intersection thereof. Also, the at least one insert outer curved ramp 48 can be tangential to its adjacent insert lower abutment surface 40 at the intersection thereof. In accordance with other embodiments of the subject matter of the present application, the at least one insert inner curved ramp 46 can also be tangential to its adjacent insert lower intermediate surface 44 at the intersection thereof.

Figure 5:
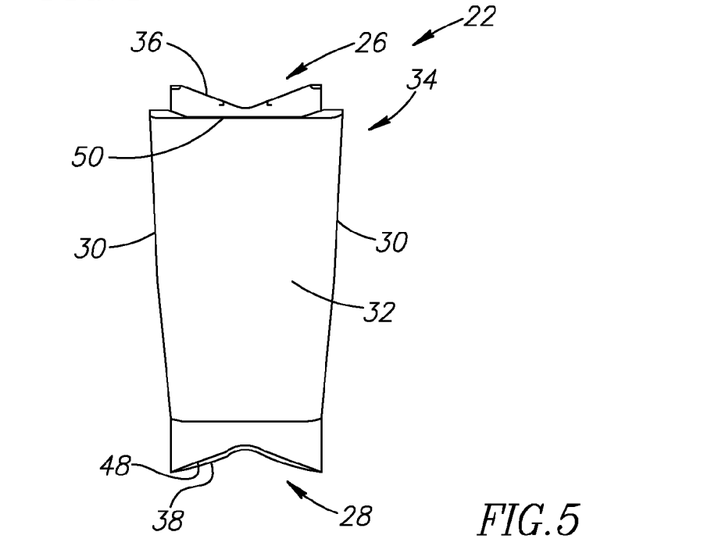
FIG. 5 is an end view of the cutting insert shown in FIG. 2.

Referring now to FIG. 5, the insert upper abutment surface 36 and the insert lower surface 28 can be generally V-shaped in an end view of the cutting insert 22. In accordance with some embodiments of the present application, the insert upper abutment surface 36 and the insert lower surface 28 can be of a female groove type. This configuration, which provides a clamping mechanism whereby lateral displacement of the cutting insert 22, 122 is restricted when clamped within the holder blade 24, is well known and is not part of the invention.

Figure 6:
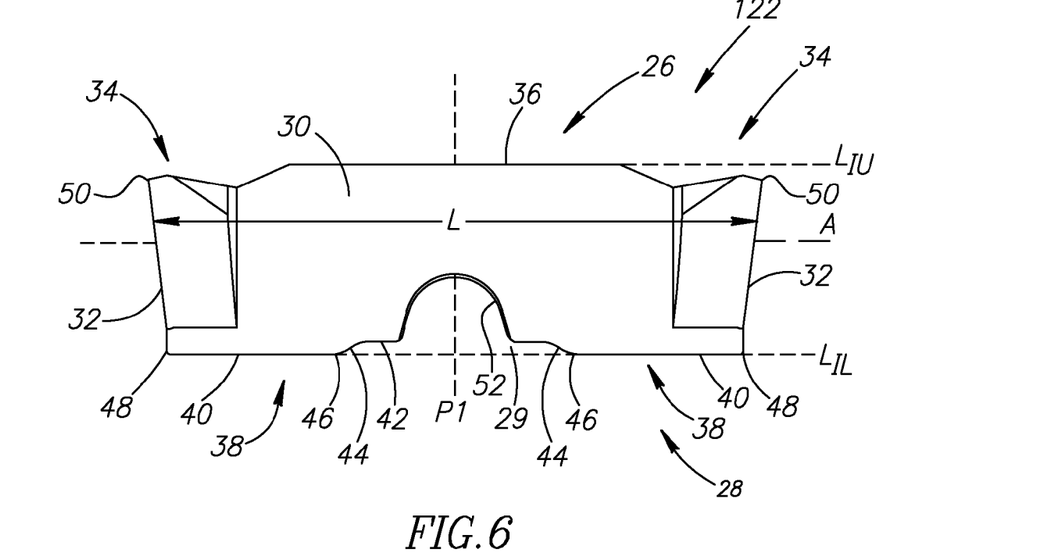
FIG. 6 is a side view of a cutting insert in accordance with a second embodiment of the present application.
Figure 15:
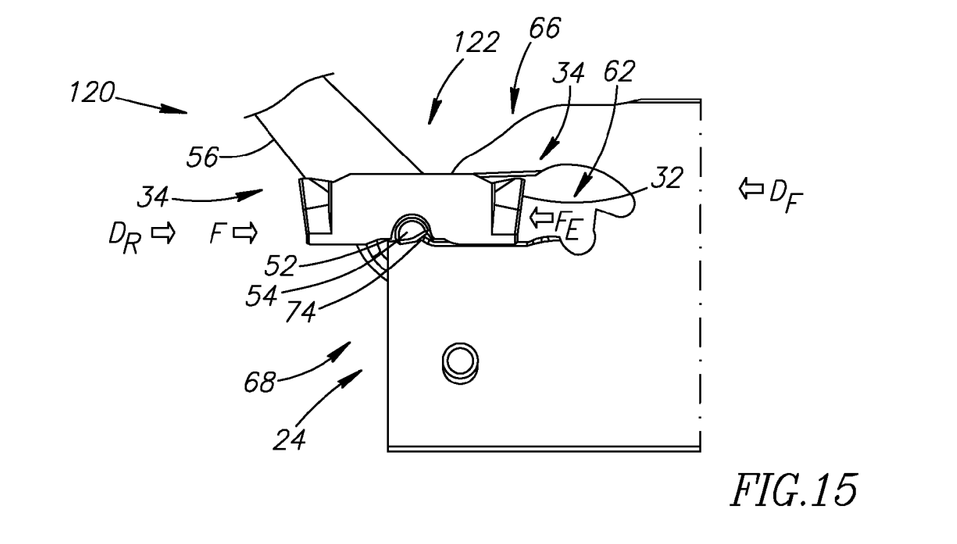
FIG. 15 is a side view of the cutting tool in accordance with the second embodiment of the present application, with a key positioned in an insert central lower recess.

Referring to FIG. 6, in accordance with a second embodiment of the present application, the insert central lower surface 42 of the cutting insert 122 can have a substantially semi-circular insert central lower recess 52. It should be noted that the substantially semi-circular insert central lower recess 52 is provided for the insertion of a protrusion 54 of a key 56 (see FIG. 15) that can be pivoted in order to apply an urging force for the purpose of positioning the cutting insert 122 into its clamped position, relative to the holder blade 24.

Figure 7:
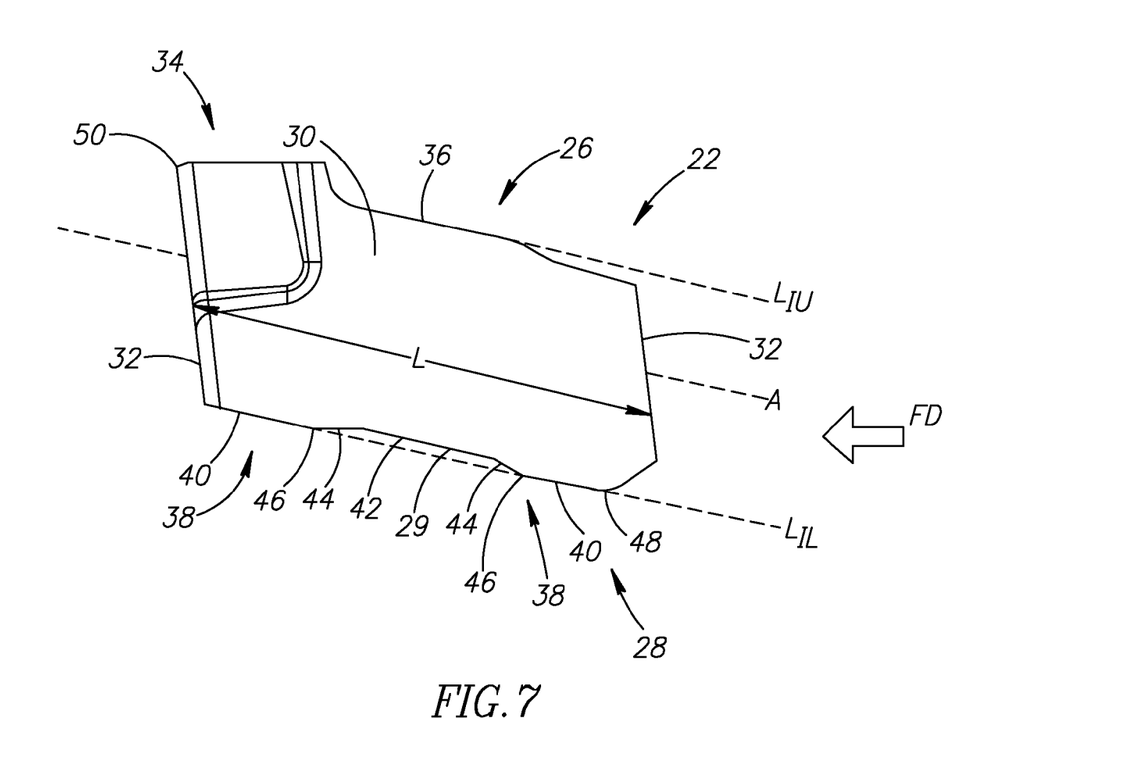
FIG. 7 is a side view of another cutting insert in accordance with the first embodiment of the present application.

Attention is drawn to FIG. 7, which shows an example of a single-ended cutting insert 22 in accordance with the present application having a single cutting portion 34. In this non-limiting example of the present application, the insert longitudinal axis A is not parallel to the feed direction FD of the cutting insert 22 when the cutting insert 22 is clamped in a blade holder 24 and engaging a workpiece. However, in other examples, the insert longitudinal axis A can be parallel to the feed direction FD of the cutting insert 22 when the cutting insert 22 is clamped in a blade holder 24 and engaging a workpiece.

When the cutting insert 22 is single-ended then there is exactly one insert inner curved ramp 46 and one insert outer curved ramp 48. That is to say, only the insert lower component surface 38 closest to the single cutting portion 34 has an insert inner curved ramp 46, and only the insert lower component surface 38 furthest from the single cutting portion 34 has an insert outer curved ramp 48.

Figure 8:
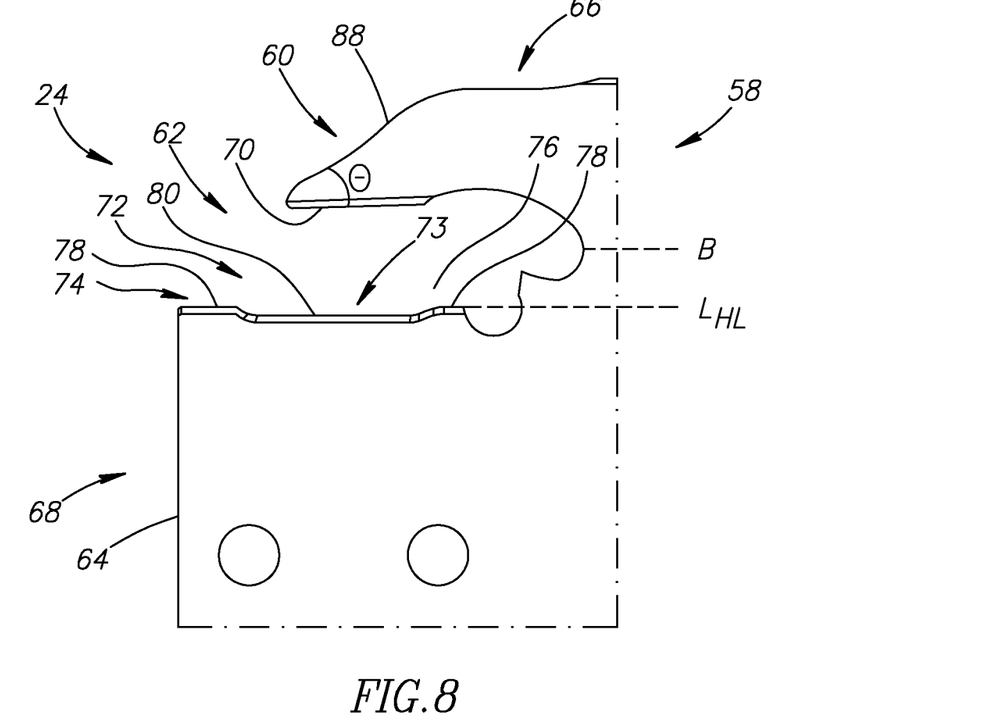
FIG. 8 is a side view of a holder blade shown in FIG. 2.

Attention is now drawn to FIG. 8 showing the holder blade 24, for resiliently retaining the cutting insert 22, 122 described herein. The holder blade 24 has a holder longitudinal axis B that defines a forward to rearward direction $D_F$, $D_R$. It should be appreciated that use of the terms "forward" and "rearward" throughout the description and claims refer to a relative position in a direction of the holder longitudinal axis B towards the left and right, respectively, in FIGS. 8 to 13 and 15. The holder blade 24 has a body portion 58 and a clamping portion 60 integrally formed with the body portion 58. The clamping portion 60 has an insert receiving slot 62 opening out to a holder front end surface 64 of the holder blade 24. The insert receiving slot 62 has an upper clamping jaw 66 and a lower base jaw 68, where the upper clamping jaw 66 is resiliently displaceable with respect to the lower base jaw 68. The upper clamping jaw 66 has a clamping jaw abutment surface 70. The lower base jaw 68 has a base jaw lower surface 72.

The base jaw lower surface 72 has two spaced apart base jaw component surfaces, a front base jaw component surface 74 adjacent the holder front end surface 64 and a rear base jaw component surface 76 rearwardly spaced apart from the front base jaw component surface 74. In accordance with some embodiments of the subject matter of the present application the front and rear base jaw component surfaces 74, 76 each have a holder lower abutment surface 78. In a side view of the holder blade 24, the two spaced apart holder lower abutment surfaces 78 can form sections of a holder lower imaginary line $L_{HL}$ which is parallel to the holder longitudinal axis B.

Figure 9:
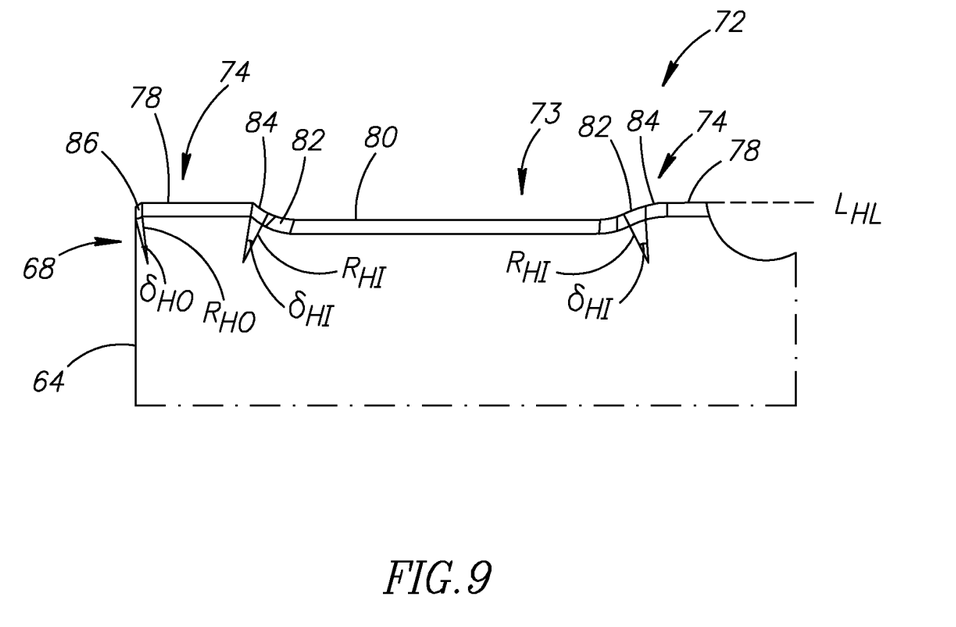
FIG. 9 is a detailed view of the holder blade shown in FIG. 8.

Referring to FIG. 9, the base jaw lower surface 72 has a non-abutting base jaw central surface 80 located between, and recessed with respect to, the front and rear base jaw component surfaces 74, 76. The non-abutting base jaw central surface 80 is formed in a single, elongated base jaw cutout 73 which is visible in a side view of the holder blade 24 and is bounded on one side by the holder lower imaginary line $L_{HL}$. In at least some embodiments, the elongated base jaw cutout 73 extends for at least one-third the length of the base jaw lower surface 72. The base jaw lower surface 72 has two spaced apart holder lower intermediate surfaces 82, which extend between the base jaw central surface 80 and its adjacent front and rear base jaw component surfaces 74, 76. Each of the front and rear base jaw component surfaces 74, 76 can include a holder inner curved ramp 84 extending from its holder lower abutment surface 78 to the adjacent holder lower intermediate surface 82. Each holder inner curved ramp 84 can have a holder inner radius of curvature $R_{HI}$, which subtends a holder inner angle of curvature $\delta_{HI}$, where $\delta_{HI}$ can be greater or equal to 20° and less than or equal to 40°. For example, the holder inner angle of curvature $\delta_{HI}$ can have a value of 30°.

The front base jaw component surface 74 can include a holder outer curved ramp 86 extending from its holder lower abutment surface 78 to the adjacent holder front end surface 64. The holder outer curved ramp 86 can have a holder outer radius of curvature $R_{HO}$, which subtends a holder outer angle of curvature $\delta_{HO}$, where $\delta_{HO}$ can be greater or equal to 5° and less than or equal to 25°. For example, the insert outer angle of curvature $\delta_{HO}$ can have a value of 15°.

In accordance with some embodiments of the subject matter of the present application the holder outer radius of curvature $R_{HI}$ can be equal to the holder outer radius of curvature $R_{HO}$.

Further in accordance with some embodiments of the subject matter of the present application, the two holder inner curved ramps 84 can be tangential to their adjacent holder lower abutment surface 78 at the intersection thereof. Also, the one holder outer curved ramp 86 can be tangential to its adjacent holder lower abutment surface 78 at the intersection thereof. Also, the two holder inner curved ramps 84 can be tangential to their adjacent holder lower intermediate surfaces 82 at the intersection thereof.

The clamping jaw abutment surface 70 and the base jaw lower surface 72 can be generally V-shaped, in a front end view. In accordance with some embodiments, the clamping jaw abutment surface 70 and the base jaw lower surface 72 can be of a male groove type. This configuration, which provides a clamping mechanism where the cutting insert 22, 122 can not be displaced laterally when clamped within the holder blade 24 is well known and is not part of the invention.

Figure 10:
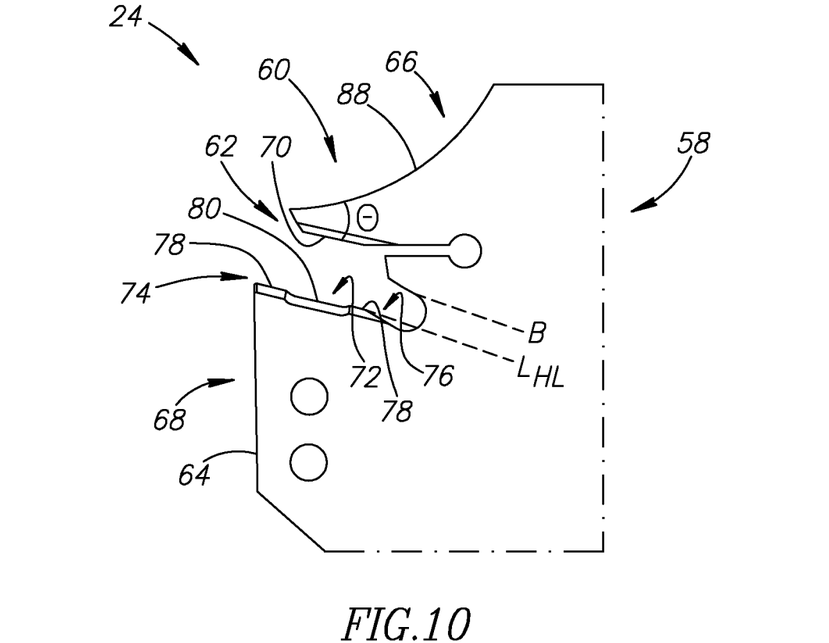
FIG. 10 is a side view of another holder blade suitable for clamping the cutting insert shown in FIG. 7.

Attention is drawn to FIG. 10, which shows an example the holder blade 24 in accordance with the present application which is suitable for the single-ended cutting insert 22, 122 that is shown in FIG. 7.

Referring back to FIG. 1, the cutting tool 20 has a cutting insert 22 resiliently clamped between the upper clamping jaw 66 and the lower base jaw 68. The insert upper abutment surface 36 abuts the clamping jaw abutment surface 70, the insert lower abutment surface 40 of the insert lower component surface 38 closest to the operative cutting portion 34 abuts the holder lower abutment surface 78 of the front base jaw component surface 74, and the insert lower abutment surface 40 of the insert lower component surface 38 furthest from the operative cutting portion 34 abuts the holder lower abutment surface 78 of the rear base jaw component surface 76. At least the insert lower component surface 38 closest to the operative cutting portion 34 has an insert inner curved ramp 46, and at least the insert lower component surface 38 furthest from the operative cutting portion 34 has an insert outer curved ramp 48.

Figure 11:
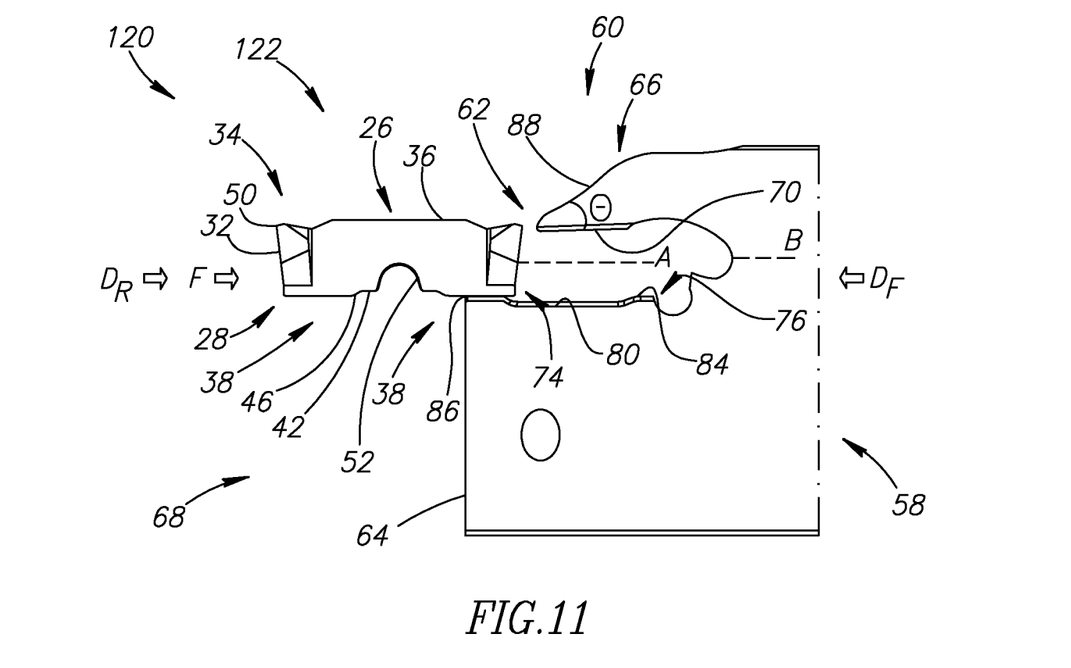
FIG. 11 is a side view of the cutting tool with the cutting insert in a first position in accordance with the second embodiment of the present application.
Figure 14:
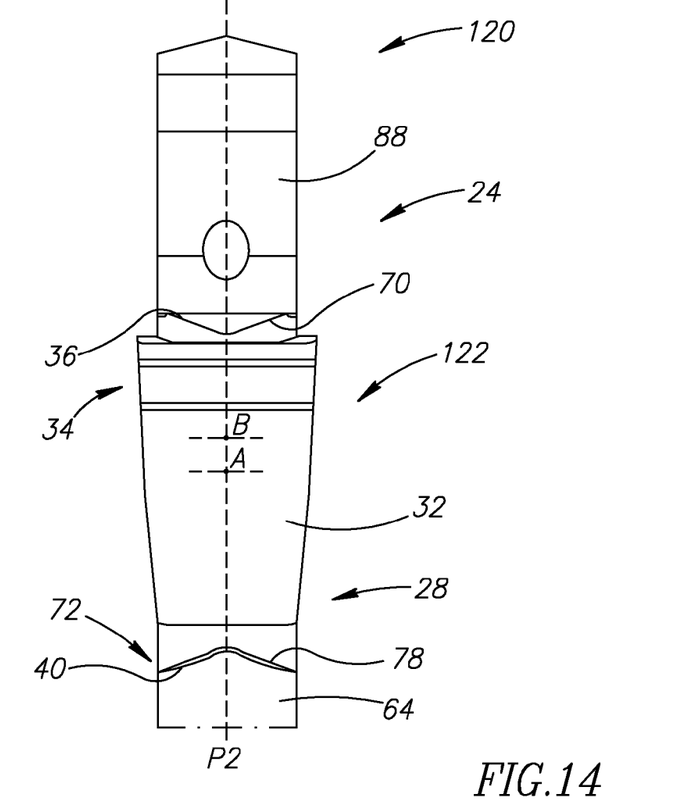
FIG. 14 is a front view of the cutting tool with the cutting insert in a clamped position in accordance with the second embodiment of the present application.

Another aspect of the present application also includes a method of assembling the cutting tool 20, 120. Reference is first made to FIG. 11, showing the cutting insert 22 of the first embodiment, although the method is also applicable for the second embodiment of the cutting insert 122. The cutting insert 22, 122 is positioned relative to the holder blade 24 so that the insert longitudinal axis A and the holder longitudinal axis B are contained in a mutual main plane P2 and the insert lower surface 28 is in contact the base jaw lower surface 72 (see FIG. 14).

Figure 12:
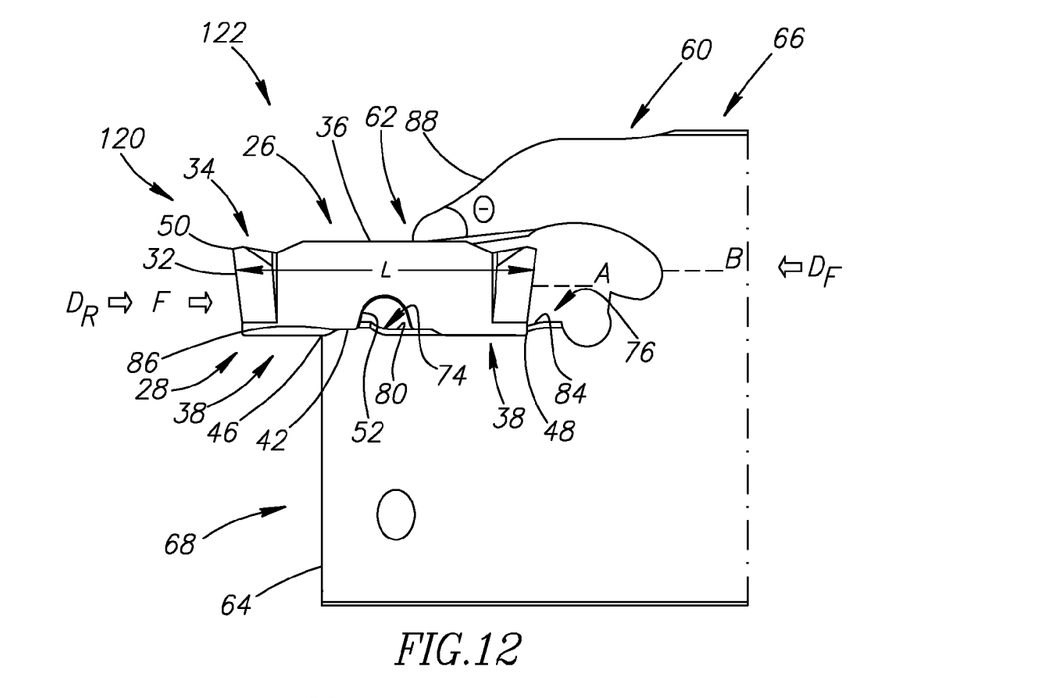
FIG. 12 is a side view of the cutting tool with the cutting insert in a second position in accordance with the second embodiment of the present application.

Referring now to FIG. 12, the cutting insert 22, 122 is slid rearwardly until the upper clamping jaw 66 undergoes resilient displacement. It should be noted that greater than half the longitudinal insert length L can be rearward of the holder front end surface 64 before the upper clamping jaw 66 undergoes resilient displacement. This has the beneficial effect of reducing the remaining insertion distance for the cutting insert 22, 122 to reach a clamped position, whilst the upper clamping jaw 66 is resiliently displaced.

Figure 13:
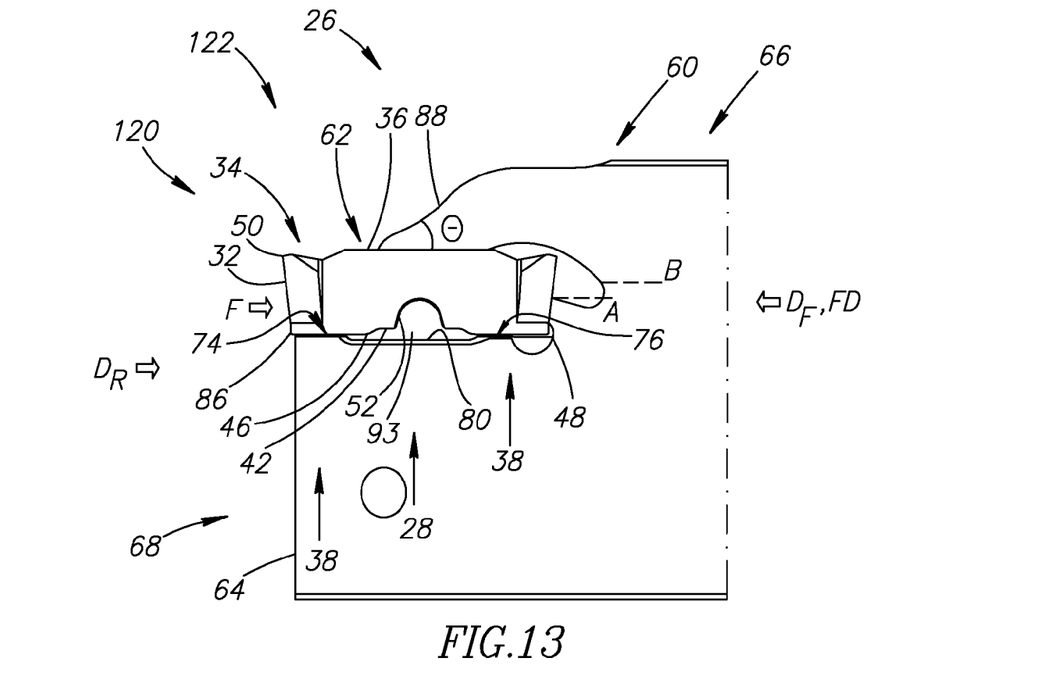
FIG. 13 is a side view of the cutting tool with the cutting insert in a clamped position in accordance with the second embodiment of the present application.

Referring now to FIG. 13, an urging force F is applied to the cutting insert 22, 122 in the rearward direction $D_R$ until the insert lower abutment surface 40 of the insert lower component surface 38 closest to the operative cutting portion 34 abuts the holder lower abutment surface 78 of the front base jaw component surface 74 and the insert lower abutment surface 40 of the insert lower component surface 38 furthest from the operative cutting portion 34 abuts the holder lower abutment surface 78 of the rear base jaw component surface 76. In this clamped position, the elongated lower insert cutout 29 opposes the elongated base jaw cutout 73, and the recessed insert central lower surface 42 opposes the recessed base jaw central surface 80, thereby forming a pass-through 93 between the cutting insert and base jaw lower surface 72, said pass-though 93 being visible in a side view of the assembled cutting tool.

The method for assembling a longitudinally elongated cutting insert 22, 122 in a holder blade 24 requires no additional means for resiliently displacing the upper clamping jaw 66 relative to the lower base jaw 68.

Thus in contrast to U.S. Pat. No. 5,697,271, for example, the upper clamping jaw 66 is devoid of a throughbore for the key 56 to engage with and widen the insert receiving slot 62. This allows, inter alia, the upper clamping jaw 66 to be formed with a shape that is advantageous for the evacuation of metal chips and other debris. For example, the internal angle θ formed between an upper clamping jaw top surface 88 of the upper clamping jaw 66 and the clamping jaw abutment surface 70 can be reduced. This has the effect of causing the metal chips, formed from the metal working of the work piece, to be deflected with less impact on the upper clamping jaw top surface 88 of the upper clamping jaw 66 and will thus cause less damage to said upper clamping jaw 66, thereby extending its life.

Another advantage of the absence of a throughbore is the possibility to include a cooling system (not shown) in the upper clamping jaw 66 of the cutting tool 20, 120 whereby a cooling duct, for the provision of a cooling fluid, can extend through the upper clamping jaw 66. Clearly, the existence of a throughbore in the upper clamping jaw 66 would significantly limit the path of such a cooling duct making it difficult for such a cooling system to be implemented.

The ability to urge the cutting insert 22, 122 into a clamped position within the insert receiving slot 62, with no additional means for resiliently displacing the upper clamping jaw 66 relative to the lower base jaw 68, is achieved by having the insert central lower surface 42 and the base jaw central surface 80 recessed, which has the effect that the insert upper abutment surface 36 can slide freely relative to the clamping jaw abutment surface 70 and insert lower component surface 38 closest the operative cutting portion 34 can slide freely relative to the base jaw central surface 80 until at least one of the insert inner or outer curved ramps 46, 48 comes into contact with its respective front or rear base jaw component surfaces 74, 76. That is to say, until the upper clamping jaw 66 undergoes resilient displacement. This allows a significant longitudinal portion of the cutting insert 22, 122 to be inserted into the insert receiving slot 62 before the necessity of providing any substantial force. That is to say that more than half the longitudinal insert length L is rearward of the holder front end surface 64 before the upper clamping jaw 66 undergoes resilient displacement. At such a defined point the cutting insert 22, 122 is in a stable position within the holder blade 24 and a mechanism to apply a urging force F to urge the cutting insert 22, 122 into a clamped position (for example with the aid of the key 56), can be applied more easily than if the cutting insert 22, 122 was in an unstable position, and liable to be inadvertently 'knocked' out of position before the urging force F could be applied.

It will also be understood that the curved properties of the insert inner and outer curved ramps 46, 48 allow the cutting insert 22, 122 to be positioned in the clamping position in a smooth manner. The curved ramps also ensure there is a gradual increase in resistance to the insertion of the cutting insert 22, 122, caused by the resilient displacement of the upper clamping jaw 66, to the final clamping position, which allows the insertion of the cutting insert 22, 122 to be performed in a controlled and fluid fashion.

Yet another feature of the subject matter of the present application is that the resilient clamping force provided by the upper clamping jaw 66 and the lower base jaw 68 is improved. In the present application, in order to position the cutting insert 22, 122 into a clamping position, the upper clamping jaw 66 is displaced, relative to the lower base jaw 68, by a minimum distance. That is to say, the upper clamping jaw 66 is displaced only by the cutting insert 22, 122, and no additional space between the cutting insert 22, 122 and the upper clamping jaw 66 needs to be provided. Therefore, the resilience in the upper clamping jaw 66 is maximized to provide a greater clamping force.

It should further be noted that another feature in the second embodiment of the present application having a cutting insert 122 with an insert central lower recess 52 is that there is no requirement for a recess at the rear of the insert receiving slot 62 to accommodate the protrusion 54 of the key 56 when removing the cutting insert 122 from the holder blade 24. The absence of the recess allows the upper clamping jaw 66 to have increased resilience with respect to the lower base jaw 68, thereby providing clamping forces of a greater magnitude.

Another feature in accordance with the second embodiment of the present application having the cutting insert 122 with the insert central lower recess 52 is that, when removing the cutting insert 122 from the holder blade 24 with the key 56 and applying an extraction force $F_E$ on the insert central lower recess 52, the cutting insert 122 can be ejected from the insert receiving slot 62 in a controlled manner. This is achieved since, when pivoting the key 56 in a forward direction $D_E$ in order to remove the cutting insert 122, the protrusion 54 of the key 56 comes into contact with the front base jaw component surface 74 (see FIG. 15). This contact prevents the key 56 being pivoted further and occurs while the cutting insert 122 is still partially located in the insert receiving slot 62. At this point, the protrusion 54 of the key 56 can be removed from the insert central lower recess 52 so that the cutting insert 122 can be completely removed from the holder blade 24 in a controlled manner. If, for example, the extraction force $F_E$ is applied to the end surface 32 furthest from the operative cutting portion 34, the cutting insert 22 would be liable to be fully displaced from the insert receiving slot 62. It such a scenario, for a double-ended cutting insert for example, the tool operator may not know which cutting portion 34 has been used and which cutting portion is unused 34.

Although the subject matter of the present application has been described to a certain degree of particularity, it should be understood that various alterations and modifications could be made without departing from the spirit or scope of the invention as hereinafter claimed.

What is claimed is:

1. A double-ended, indexable cutting insert (22, 122), longitudinally elongated in a direction defining an insert longitudinal axis (A), comprising:
   opposing insert upper and lower surfaces (26, 28) and a peripheral surface (30) extending therebetween, the peripheral surface (30) comprising two opposing end surfaces (32), each of the end surfaces (32) having an integral cutting portion (34) such that the cutting insert (22, 122) exhibits mirror symmetry about a median plane (P1) perpendicular to the insert longitudinal axis (A) and located midway between the end surfaces (32); wherein
   the insert upper surface (26) comprises an insert upper abutment surface (36);
   the insert lower surface (28) comprises:
      two longitudinally spaced apart insert lower component surfaces (38), each insert lower component surface (38) having an insert lower abutment surface (40);
      an insert central lower surface (42) located between, and recessed with respect to, the two insert lower component surfaces (38);
      an insert lower intermediate surface (44) extending between the insert central lower surface (42) and each insert lower component surface (38); wherein
      at least one of the two insert lower component surfaces (38) includes an insert inner curved ramp (46) extending from its insert lower abutment surface (40) to the adjacent insert lower intermediate surface (44) and at least the other of the two insert lower component surfaces (38) includes an insert outer curved ramp (48) extending from its insert lower abutment surface (40) in a direction of the adjacent end surface (32).

2. The cutting insert (22, 122), according to claim 1; wherein
the at least one insert inner curved ramp (46) is tangential to its adjacent insert lower abutment surface (40) at an intersection thereof, and
the at least one insert outer curved ramp (48) is tangential to its adjacent insert lower abutment surface (40) at an intersection thereof.

3. The cutting insert (22, 122), according to claim 1; wherein
the at least one insert inner curved ramp (46) has an insert inner radius of curvature ($R_{II}$) subtending an insert inner angle of curvature $\delta_{II}$, wherein $20° \leq \delta_{II} \leq 40°$, and
the at least one insert outer curved ramp (48) has an insert outer radius of curvature ($R_{IO}$) subtending an insert outer angle of curvature $\delta_{IO}$, wherein $5° \leq \delta_{IO} \leq 25°$.

4. The cutting insert (22, 122), according to claim 3, wherein the insert inner radius of curvature ($R_{II}$) is equal to the insert outer radius of curvature ($R_{IO}$).

5. The cutting insert (22, 122), according to claim 1; wherein in a side view of the cutting insert,
the two insert lower abutment surfaces (40) form sections of an insert lower imaginary line ($L_{IL}$) parallel to the insert longitudinal axis (A); and
the insert upper abutment surface (36) forms an insert upper imaginary line ($L_{IU}$) parallel to the insert longitudinal axis (A).

6. The cutting insert (22, 122), according to claim 1; wherein
the at least one insert inner curved ramp (46) is tangential to its adjacent insert lower intermediate surface (44) at the intersection thereof.

7. The cutting insert (22, 122), according to claim 1, wherein the insert upper abutment surface (36) and the insert lower surface (28) are generally V-shaped, in an end view of the cutting insert (22, 122).

8. The cutting insert (22, 122), according to claim 7, wherein the generally V-shaped insert upper abutment surface (36) and the insert lower surface (28) are of a female groove type.

9. The cutting insert (22, 122), according to claim 1, having a single cutting portion (34); wherein
only the insert lower component surface (38) closest to the single cutting portion (34) has an insert inner curved ramp (46), and
only the insert lower component surface (38) furthest from the single cutting portion (34) has an insert outer curved ramp (48).

10. The cutting insert (22, 122), according to claim 1; wherein
each of the cutting portions (34) has a cutting edge (50) associated with the insert upper surface (26).

11. The cutting insert (122), according to claim 1, wherein the insert central lower surface (42) comprises a substantially semi-circular insert central lower recess (52).

12. A cutting tool (20,120), comprising:
a holder blade (24), having a holder longitudinal axis (B) extending in a forward to rearward direction, comprising:
    a body portion (58) and a clamping portion (60);
    the clamping portion (60) having an insert receiving slot (62) opening out to a holder front end surface (64) of the holder blade (24), the insert receiving slot (62) comprising:
        an upper clamping jaw (66) having a clamping jaw abutment surface (70) and a lower base jaw (68) having a base jaw lower surface (72), the upper clamping jaw (66) being resiliently displaceable relative to the lower base jaw (68);
    the base jaw lower surface (72) comprising:
        a front base jaw component surface (74) adjacent the holder front end surface (64) and a rear base jaw component surface (76) rearwardly spaced apart from the front base jaw component surface (74), the front and rear base jaw component surfaces (74, 76) each comprising a holder lower abutment surface (78);
        a base jaw central surface (80) located between, and recessed with respect to, the front and rear base jaw component surfaces (74, 76);
        a holder lower intermediate surface (82), extending between the base jaw central surface (80) and each base jaw component surface (74, 76);
a cutting insert (22, 122) resiliently clamped between the upper clamping jaw (66) and the lower base jaw (68); wherein
the cutting insert (22, 122) is longitudinally elongated in a direction defining an insert longitudinal axis (A) and comprises:
    opposing insert upper and lower surfaces (26, 28) and a peripheral surface (30) extending therebetween, the peripheral surface (30) comprising two opposing end surfaces (32), at least one of the end surfaces (32) having an integral cutting portion (34); wherein
    the insert upper surface (26) comprises an insert upper abutment surface (36);
    the insert lower surface (28) comprises:
        two longitudinally spaced apart insert lower component surfaces (38), each insert lower component surface (38) having an insert lower abutment surface (40);
        an insert central lower surface (42) located between, and recessed with respect to, the two insert lower component surfaces (38);
        an insert lower intermediate surface (44) extending between the insert central lower surface (42) and each insert lower component surface (38); wherein
    at least one of the two insert lower component surfaces (38) includes an insert inner curved ramp (46) extending from its insert lower abutment surface (40) to the adjacent insert lower intermediate surface (44) and at least the other of the two insert lower component surfaces (38) includes an insert outer curved ramp (48) extending from its insert lower abutment surface (40) in a direction of the adjacent end surface (32);
the insert upper abutment surface (36) abuts the clamping jaw abutment surface (70), the insert lower abutment surface (40) of the insert lower component surface (38) closest to the operative cutting portion (34) abuts the holder lower abutment surface (78) of the front base jaw component surface (74), and the insert lower abutment surface (40) of the insert lower component surface (38) furthest from the operative cutting portion (34) abuts the holder lower abutment surface (78) of the rear base jaw component surface (76); and
at least the insert lower component surface (38) closest to the operative cutting portion (34) has an insert inner curved ramp (46), and at least the insert lower component surface (38) furthest from the operative cutting portion (34) has an insert outer curved ramp (48).

13. The cutting tool (20, 120), according to claim 12; wherein
each of the front and rear base jaw component surfaces (74, 76) includes a holder inner curved ramp (84) extending from its holder lower abutment surface (78) to the adjacent holder lower intermediate surface (82) and the front base jaw component surface (74) includes a holder outer curved ramp (86) extending from its holder lower abutment surface (78) to the holder front end surface (64).

14. The cutting tool (20, 120), according to claim 13; wherein
each holder inner curved ramp (84) is tangential to its adjacent holder lower abutment surface (78) at the intersection thereof, and
the holder outer curved ramp (86) is tangential to its adjacent holder lower abutment surface (78) at the intersection thereof.

15. The cutting tool (20, 120), according to claim 14; wherein
each holder inner curved ramp (84) has a holder inner radius of curvature ($R_{HI}$) subtending an holder inner angle of curvature $\delta_{HI}$, wherein $20° \leq \delta_{HI} \leq 40°$, and
the holder outer curved ramp (86) has a holder outer radius of curvature ($R_{HO}$) subtending a holder outer angle of curvature $\delta_{HO}$, wherein $5° \leq \delta_{HO} \leq 25°$.

16. The cutting tool (20, 120), according to claim 15, wherein the holder inner radius of curvature ($R_{HI}$) is equal to the holder outer radius of curvature ($R_{HO}$).

17. The cutting tool (20, 120), according to claim 12; wherein, in a side view of the cutting tool,
the two holder lower abutment surfaces (78) form sections of a holder lower imaginary line ($L_{HL}$) parallel to the holder longitudinal axis (B).

18. The cutting tool (20, 120), according to claim 12; wherein, in a side view of the cutting tool,
the two insert lower abutment surfaces (40) form sections of a lower imaginary line ($L_{IL}$) parallel to the insert longitudinal axis (A); and
the insert upper abutment surface (36) forms an insert upper imaginary line ($L_{IU}$) parallel to the insert longitudinal axis (A).

19. The cutting tool (20, 120), according to claim 12; wherein
each holder inner curved ramp (84) is tangential to its adjacent holder lower intermediate surface (82) at the intersection thereof.

20. The cutting tool (20, 120), according to claim 12, wherein the clamping jaw abutment surface (70) and the base jaw lower surface (72) are generally V-shaped, in a front end view of the cutting tool (20, 120).

21. The cutting tool (20, 120), according to claim 20, wherein the generally V-shaped clamping jaw abutment surface (70) and the base jaw lower surface (72) are of a male groove type.

22. A method for assembling a longitudinally elongated cutting insert (22, 122) in a holder blade (24), the holder blade (24), having a holder longitudinal axis (B) extending in a forward to rearward direction ($D_F$, $D_R$), comprising;
a body portion (58) and a clamping portion (60);
the clamping portion (60) having an insert receiving slot (62) opening out to a holder front end surface (64) of the holder blade (24), the insert receiving slot (62) comprising:
an upper clamping jaw (66) and a lower base jaw (68);
the upper clamping jaw (66) being resiliently displaceable relative to the lower base jaw (68),
the lower base jaw (68) having a base jaw lower surface (72), the base jaw lower surface (72) including a front base jaw component surface (74) longitudinally spaced apart from a rear base jaw component surface (76), with a base jaw central surface (80) located between and recessed with respect to the front and rear base jaw component surfaces (74, 76);
the cutting insert (22, 122) comprising:
opposing insert upper and lower surfaces (26, 28) extending substantially parallel to an insert longitudinal axis (A) and a peripheral surface (30) extending therebetween;
the insert lower surface (28) having two longitudinally spaced apart insert lower component surfaces (38), with an insert central lower surface (42) located between and recessed with respect to the two insert lower component surfaces (38); and
the peripheral surface (30) having two opposing end surfaces (32) defining a longitudinal insert length (L), at least one of the end surfaces (32) having an integral cutting portion (34),
the method comprising the steps of:
positioning the cutting insert (22, 122) relative to the holder blade (24) so that the insert longitudinal axis (A) and the holder longitudinal axis (B) are contained in a mutual main plane (P2) and the insert lower surface (28) is in contact the base jaw lower surface (72);
sliding the cutting insert (22, 122) rearwardly until the upper clamping jaw (66) undergoes resilient displacement; and
applying an urging force (F) to the cutting insert (22, 122) in the rearward direction ($D_R$) until the insert lower abutment surface (40) of the insert lower component surface (38) closest to the operative cutting portion (34) abuts the holder lower abutment surface (78) of the front base jaw component surface (74) and the insert lower abutment surface (40) of the insert lower component surface (38) furthest from the operative cutting portion (34) abuts the holder lower abutment surface (78) of the rear base jaw component surface (76).

23. The method for assembling a longitudinally elongated cutting insert (22, 122) in a holder blade (24) according to claim 22, wherein no additional means for resiliently displacing the upper clamping jaw (66) relative to the lower base jaw (68) are employed.

24. The method for assembling a longitudinally elongated cutting insert (22, 122) in a holder blade (24) according to claim 22, wherein greater than half the longitudinal insert length (L) is rearward of the holder front end surface (64) before the upper clamping jaw (66) undergoes resilient displacement.

25. A cutting insert (22, 122), longitudinally elongated in a direction defining an insert longitudinal axis (A), comprising:
opposing insert upper and lower surfaces (26, 28) and a peripheral surface (30) extending therebetween, the peripheral surface (30) comprising two opposing end surfaces (32), at least one of the end surfaces (32) having an integral cutting portion (34); wherein
the insert upper surface (26) comprises an insert upper abutment surface (36);
the insert lower surface (28) comprises:
two longitudinally spaced apart insert lower component surfaces (38), each insert lower component surface (38) having an insert lower abutment surface (40), the two spaced apart insert lower abutment surfaces (40)

forming a lower imaginary line ($L_{IL}$) parallel to the insert longitudinal axis (A), in a side view of the cutting insert;
a cutout (29) formed in the insert lower surface (28) between the two spaced apart insert lower abutment surfaces (40) and bounded on one side by the lower imaginary line ($L_{IL}$), the cutout extending for at least about one-third the length of the insert lower surface (28);
an insert inner curved ramp (46) extending from at least a first of the two insert lower component surfaces (38) in a direction of the cutout (29); and
an insert outer curved ramp (48) extending from at least a second of the two insert lower component surfaces (38) in a direction of an adjacent end surface (32).

\* \* \* \* \*